United States Patent
Zhong et al.

(10) Patent No.: US 12,038,830 B2
(45) Date of Patent: Jul. 16, 2024

(54) USING A DOUBLE-BLIND CHALLENGE TO EVALUATE MACHINE-LEARNING-BASED PROGNOSTIC-SURVEILLANCE TECHNIQUES

(71) Applicant: Oracle International Corporation, Redwood Shores, CA (US)

(72) Inventors: Rui Zhong, Alameda, CA (US); Guang C. Wang, San Diego, CA (US); Kenny C. Gross, Escondido, CA (US); Ashin George, Sunnyvale, CA (US); Zexi Chen, Mountain View, CA (US)

(73) Assignee: Oracle International Corporation, Redwood Shores (CA)

( * ) Notice: Subject to any disclaimer, the term of this patent is extended or adjusted under 35 U.S.C. 154(b) by 924 days.

(21) Appl. No.: 17/090,151

(22) Filed: Nov. 5, 2020

(65) Prior Publication Data
US 2022/0138090 A1    May 5, 2022

(51) Int. Cl.
| | |
|---|---|
| *G06F 11/30* | (2006.01) |
| *G06F 11/36* | (2006.01) |
| *G06F 21/60* | (2013.01) |
| *G06N 20/00* | (2019.01) |

(52) U.S. Cl.
CPC ...... *G06F 11/3688* (2013.01); *G06F 11/3692* (2013.01); *G06F 21/602* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,536,595 B1* | 5/2009 | Hiltunen | G06F 11/0793 714/26 |
| 2016/0357895 A1* | 12/2016 | Hyde | G06N 7/01 |
| 2019/0034566 A1* | 1/2019 | Ting | G06F 30/20 |
| 2019/0065338 A1* | 2/2019 | Bramley | G06F 11/3476 |
| 2019/0220745 A1* | 7/2019 | Huang | G06N 3/08 |
| 2019/0220776 A1* | 7/2019 | Huang | G01R 31/318583 |
| 2019/0260468 A1* | 8/2019 | Xu | H04B 10/035 |
| 2021/0101607 A1* | 4/2021 | Du | G06F 30/20 |

* cited by examiner

*Primary Examiner* — Mujtaba M Chaudry
(74) *Attorney, Agent, or Firm* — Park, Vaughan, Fleming & Dowler LLP (57) ABSTRACT

A double-blind comparison is performed between prognostic-surveillance systems, which are located on a local system and a remote system. During operation, the local system inserts random faults into a dataset to produce a locally seeded dataset, wherein the random faults are inserted into random signals at random times with variable fault signatures. Next, the local system exchanges the locally seeded dataset with a remote system, and in return receives a remotely seeded dataset, which was produced by the remote system by inserting different random faults into the same dataset. Next, the local system uses a local prognostic-surveillance system to analyze the remotely seeded dataset to produce locally detected faults. Finally, the local system determines a performance of the local prognostic-surveillance system by comparing the locally detected faults against actual faults in the remotely seeded fault information. The remote system similarly determines a performance of a remote prognostic-surveillance system.

20 Claims, 6 Drawing Sheets

USING A DOUBLE-BLIND CHALLENGE TO EVALUATE MACHINE-LEARNING-BASED PROGNOSTIC-SURVEILLANCE TECHNIQUES

BACKGROUND

Field

The disclosed embodiments generally relate to techniques for using machine-learning (ML) models to perform prognostic-surveillance operations based on time-series sensor signals from a monitored system. More specifically, the disclosed embodiments relate to a technique for generating a double-blind challenge to evaluate ML-based prognostic-surveillance techniques.

Related Art

Large numbers of sensors are presently deployed to monitor the operational health of critical assets in a large variety of business-critical systems. For example, a medium-sized computer data center can include over 1,000,000 sensors monitoring thousands of servers, a modern passenger jet can include 75,000 sensors, an oil refinery can include over 1,000,000 sensors, and even an ordinary car can have over 100 sensors. These sensors produce large volumes of time-series sensor data, which can be used to perform prognostic-surveillance operations to facilitate detecting incipient anomalies. This makes it possible to take remedial action before the incipient anomalies develop into failures in the monitored assets.

Machine-learning (ML) techniques are commonly used to perform prognostic-surveillance operations on time-series sensor data, and also for validating the integrity of the sensors themselves. ML-based prognostic-surveillance techniques typically operate by training an ML model (also referred to as an "inferential model") to learn correlations among time-series signals. The trained ML model is then placed in a surveillance mode where it used to predict values for time-series signals based on the correlations with other time-series signals, wherein deviations between actual and predicted values for the time-series signals trigger alarms that indicate an incipient anomaly. This makes it possible to perform remedial actions before the underlying cause of the incipient anomaly leads to a catastrophic failure.

A compelling way to win over customers for a prognostic-surveillance system is to perform a head-to-head competition between competing prognostic-surveillance systems, which is referred to as a "challenge." During this challenge, competing prognostic-surveillance systems are evaluated based on the same dataset of signals to determine which system: detects the most faults, generates the smallest number of false alarms, and has the smallest number of missed alarms. Moreover, when faults are detected, it is useful to determine which system provides the earliest warnings of developing faults, and which systems are better able to detect faults in the presence of noise or other sensor-related artifacts, such as missing signal values, highly quantized values and phase misalignments between signals.

One obstacle to performing such a challenge is obtaining the legal rights to use the same database of signals for a side-by-side comparison. This is problematic because of legal privacy restrictions. It typically takes a significant amount of time to obtain legal permissions to exchange ML codes with a customer. Moreover, data privacy issues often make it difficult for a customer to provide "real data," which can be used to evaluate competing prognostic-surveillance techniques.

Then, there is the issue of who actually inserts "hidden faults" in the data to evaluate the effectiveness of competing prognostic-surveillance techniques. Suppose a vendor for a prognostic-surveillance system inserts hidden faults into the data, and gives the data to a potential customer to evaluate their existing ML system, while the vendor processes the same data using their competing ML system. If the vendor's competing ML system "wins" the challenge, the customer may feel that the vendor had an unfair advantage because the vendor could have configured their competing ML system to more carefully examine the places where the "hidden" faults are located. A similar problem exists if an employee of the customer inserts the hidden faults into the data because the employee could have similarly configured their existing ML system to more carefully examine the places where the "hidden" faults are located.

Hence, what is needed is a technique for comparing competing prognostic-surveillance systems without the complications produced by the above-described problems.

SUMMARY

The disclosed embodiments relate to a system that performs a double-blind comparison between competing prognostic-surveillance systems, which are located on a local system and a remote system. During operation, the local system obtains a dataset comprising time-series signals associated with sensors in a monitored asset. Next, the local system executes a script that inserts random faults into the dataset to produce a locally seeded dataset, wherein the random faults are inserted into random signals at random times with variable fault signatures. During execution of the script, the local system assembles and encrypts locally seeded fault information, which specifies a signal number, an insertion time and a fault signature for each fault in the locally seeded dataset. Next, the local system sends the locally seeded dataset and the locally seeded fault information to a remote system. In return, the local system receives a remotely seeded dataset and remotely seeded fault information from the remote system, wherein the remotely seeded dataset was produced by the remote system by using the same script to insert different random faults into the same dataset. Next, the local system uses a local prognostic-surveillance system to analyze the remotely seeded dataset to produce locally detected faults. Then, the local system decrypts the remotely seeded fault information using a remote decryption key received from the remote system. Finally, the local system determines a performance of the local prognostic-surveillance system by comparing the locally detected faults against the remotely seeded fault information.

In some embodiments, while the local system is operating, the remote system obtains the dataset comprising time-series signals associated with sensors in the monitored asset. Next, the remote system executes the script to insert random faults into the dataset to produce the remotely seeded dataset. During execution of the script, the remote system assembles and encrypts the remotely seeded fault information. Then, the remote system sends the remotely seeded dataset and the remotely seeded fault information to the local system. In return, the remote system receives the locally seeded dataset and the locally seeded fault information from the local system. Next, the remote system uses a remote prognostic-surveillance system to analyze the locally seeded dataset to produce remotely detected faults. The remote system then decrypts the locally seeded fault information using a local decryption key received from the local system. Finally, the remote system determines a performance of the remote prognostic-surveillance system by comparing the remotely detected faults against the locally seeded fault information.

In some embodiments, the system additionally determines a winner of the double-blind comparison by comparing the determined performances of the local and remote prognostic-surveillance systems.

In some embodiments, prior to inserting the faults, the remote system includes sensor artifacts in the dataset. During this process, the remote system does one or more of the following: introduces randomly distributed missing values into a random subset of time-series signals in the dataset; quantizes a random subset of time-series signals in the dataset; and introduces random time shifts into random clusters of time-series signals in the dataset.

In some embodiments, while obtaining the dataset, the remote system synthetically generates time-series signals, which mirror real time-series signals produced by sensors in the monitored asset.

In some embodiments, the fault signatures can include: fault signatures obtained from a library of fault signatures; and fault signatures based on superimposed ramps.

In some embodiments, the random faults are only inserted into a second portion of the dataset, wherein a first portion of the dataset is used to train the local prognostic-surveillance system.

In some embodiments, while using the local prognostic-surveillance system to analyze the remotely seeded dataset, the local system: uses a local inferential model to generate estimated values based on time-series signals from the remotely seeded dataset; performs a pairwise differencing operation between actual values and the estimated values to produce residuals; and analyzes the residuals to detect the incipient anomalies in the monitored system.

In some embodiments, the incipient anomalies can include an impending failure of the monitored system, and a malicious-intrusion event in the monitored system.

In some embodiments, while determining the performance of the local prognostic-surveillance system, the local system considers the following: a number of correctly identified faults; a number of false alarms; and a number of missed alarms.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Exemplary Prognostic-Surveillance System

Figure 1:
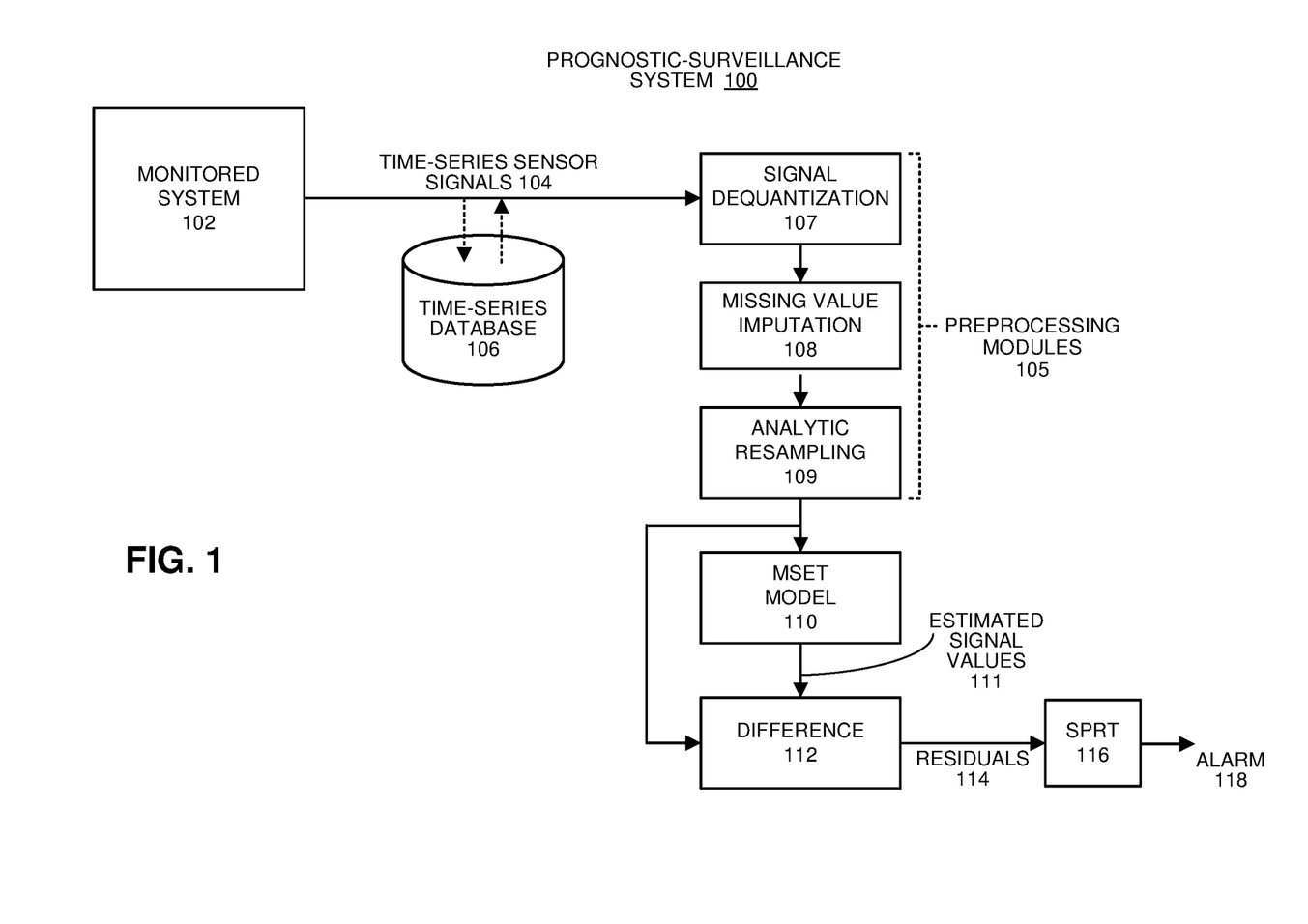
FIG. 1 illustrates an exemplary prognostic-surveillance system in accordance with the disclosed embodiments.

Before describing our double-blind challenge technique, we first describe a prognostic-surveillance system in which the technique can be used. FIG. 1 illustrates a prognostic-surveillance system 100 that accesses a time-series database 106, containing time-series signals in accordance with the disclosed embodiments. As illustrated in FIG. 1, prognostic-surveillance system 100 operates on a set of time-series sensor signals 104 obtained from sensors in a monitored system 102. Note that monitored system 102 can generally include any type of machinery or facility, which includes sensors and generates time-series signals. Moreover, time-series signals 104 can originate from any type of sensor, which can be located in a component in monitored system 102, including: a voltage sensor; a current sensor; a pressure sensor; a rotational speed sensor; and a vibration sensor.

During operation of prognostic-surveillance system 100, time-series signals 104 can feed into a time-series database 106, which stores the time-series signals 104 for subsequent analysis. Next, the time-series signals 104 either feed directly from monitored system 102 or from time-series database 106 through a set of preprocessing modules 105 and into a Multivariate State Estimation Technique (MSET) pattern-recognition model 110.

Preprocessing modules 105 deal with various sensor artifacts in time-series signals 104. More specifically, preprocessing modules 105 include a signal dequantization module 107, a missing value imputation module 108 and an analytic resampling module 109. Dequantization module 107 dequantizes low-resolution time-series signals to produce higher-resolution time-series signals. (See U.S. Pat. No. 10,496,084, entitled "Dequantizing Low-Resolution IOT Signals to Produce High-Accuracy Prognostic Indicators," by inventors Kenny C. Gross, et al., filed 6 Apr. 2018, which is incorporated by reference herein.) Missing value imputation module 108 replaces missing data values in the time-series signals with imputed data values determined based on correlations among the signals. (See U.S. Pat. No. 7,292,952, entitled "Replacing a Signal from a Failed Sensor with an Estimated Signal Derived from Correlations with Other Signals," by inventors Kenny C. Gross, et al., filed 3 Feb. 2004, which is incorporated by reference herein.) Finally, analytic-resampling process (ARP) module 109 resynchronizes data measurements, which are out of phase because of clock-synchronization disparities in measurement instrumentation for different signals. (See U.S. Pat. No. 7,292,659, entitled "Correlating and Aligning Monitored Signals for Computer System Performance Parameters," by inventors Kenny C. Gross, et al., filed 26 Sep. 2003, which is incorporated by reference herein.)

As noted above, after passing through preprocessing modules 105, time-series signals 104 feed into MSET module 110. Although it is advantageous to use an inferential model, such as MSET, for pattern-recognition purposes, the disclosed embodiments can generally be used with any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 110 is "trained" to learn patterns of correlation among the time-series signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 111 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate an alarm 118. (For a description of the SPRT model, please see Wald, Abraham, June 1945, "Sequential Tests of Statistical Hypotheses." *Annals of Mathematical Statistics.* 16 (2): 117-186.) In this way, prognostic-surveillance system 100 can proactively alert system operators of incipient anomalies, such as impending failures, hopefully with enough lead time so that such problems can be avoided or proactively fixed.

Figure 2:
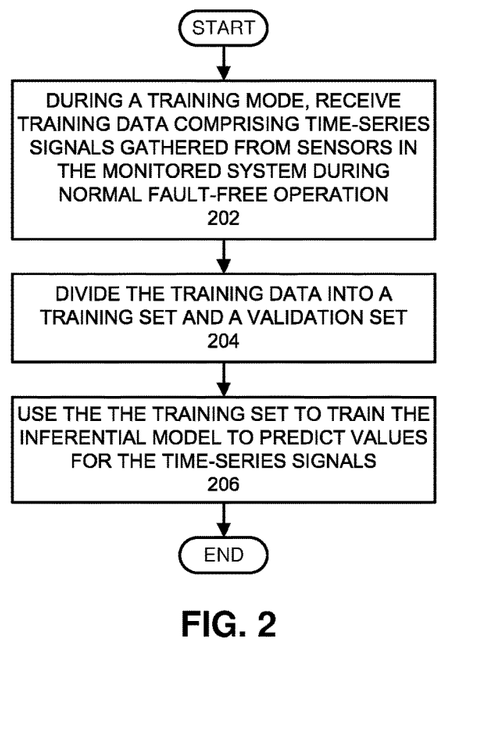
FIG. 2 presents a flow chart illustrating a process for training an inferential model in accordance with the disclosed embodiments.
Figure 3:
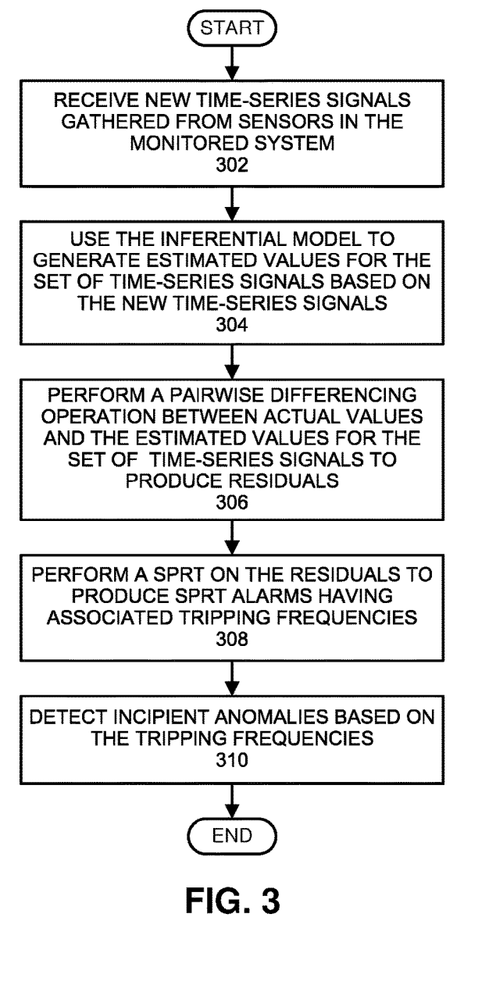
FIG. 3 presents a flow chart illustrating a process for using an inferential model to perform prognostic-surveillance operations in accordance with the disclosed embodiments.

The prognostic-surveillance system 100 illustrated in FIG. 1 operates generally as follows. During a training mode, which is illustrated in the flow chart in FIG. 2, the system receives training data comprising time-series signals gathered from sensors in the monitored system under normal fault-free operation (step 202). Next, the system divides the training data into a training set and a validation set (step 204). The system then trains the inferential model to predict values of the time-series signals based on the training set (step 206). During a subsequent surveillance mode, which is illustrated by the flow chart in FIG. 3, the system receives new time-series signals gathered from sensors in the monitored system (step 302). Next, the system uses the inferential model to generate estimated values for the set of time-series signals based on the new time-series signals (step 304). The system then performs a pairwise differencing operation between actual values and the estimated values for the set of time-series signals to produce residuals (step 306). The system then analyzes the residuals to detect the incipient anomalies in the monitored system. This involves performing a SPRT on the residuals to produce SPRT alarms with associated tripping frequencies (step 308), and then detecting incipient anomalies based on the tripping frequencies (step 310). Note that these incipient anomalies can be associated with an impending failure of the monitored system, or a malicious-intrusion event in the monitored system.

Sensor Artifacts

During operation, the disclosed embodiments generate a dataset comprising realistic sensor signals that possess "sensor artifacts," which are known to make anomaly detection challenging. These sensor artifacts include: missing values in individual time-series signals; quantized signals caused by low-resolution sensors; and clock-mismatch issues in timestamps associated with sensor readings.

Missing data values are a growing challenge for systems that monitor time-series sensor data. With the large number of sensors that are currently being deployed in monitored systems, it is not economically feasible to have all sensors individually wired to the data-acquisition system. Instead, sensor signals are typically digitized close to the locations of the physical sensors, and are then multiplexed and transmitted over a "signal bus" to a centralized data-acquisition system. Unfortunately, because of the large number of sensors and limited bus bandwidth, this signal bus can become intermittently saturated. This causes missing data values on the receiving side, or alternatively "stale values" because in some systems if a new "fresh" value for a signal is not available, the receiving side will simply repeat the last "fresh" received value. Another reason for missing values is the recent proliferation of wireless sensors, which have become increasingly more common as the cost of wireless sensor systems has dropped below the cost of dense-sensor, wired data-acquisition systems. Note that wireless sensors have much greater missing-value rates than hard-wired sensors. Yet another reason for missing values is that sensor data is now commonly transmitted via cellular networks. The problem with cellular networks is that up to 5% of the packets can be dropped.

Conventional approaches for handling missing values are based on "interpolation." However, no matter how sophisticated the interpolation technique is, it does not perform well for prognostics, because it attempts to fill in a blind spot without information about the system dynamics that cause signal values to change during the blind spot. In contrast, the disclosed embodiments use a technique called "missing value imputation," which uses information from multiple correlated signals that are not missing to "impute" missing signal values, and thereby achieves a higher accuracy than interpolation. See U.S. Pat. No. 7,292,952 (cited above).

Clock mismatch issues often arise in multiple signals that are streaming in parallel from a monitored asset. Historically, when few sensors were used for prognostic-surveillance purposes, several monitored sensors for an asset could be sampled simultaneously from one data acquisition system (DAQ) with one clock. However, with the recent explosion of sensors in monitored systems, it is common for clusters of signals to pass through separate DAQs, each with its own clock. The DAQ clocks are typically configured by humans; this means human error can cause mismatched timestamps in signals that should be well correlated. Moreover, even when disparate DAQ clocks are synchronized at the beginning of system operation, a number of mechanisms can cause clocks to subsequently drift out of synchrony. These clock mismatch issues can cause problems when the time-series signals are later used for prognostic-surveillance purposes. Slight asynchronies in parallel signals can cause correlation patterns to "get blurry," which increases false alarm probabilities (FAPs) and missed alarm probabilities (MAPs). The disclosed embodiments make use of a technique called the "analytical resampling process" (ARP) to overcome these clock mismatch issues. See U.S. Pat. No. 7,292,659 (cited above).

Quantization issues arise because many computer system vendors use 8-bit analog-to-digital (A/D) chips to digitize physical variables (e.g. temperature, voltage, current, RPM, power, etc.). The use of 8-bit A/D chips results in digitized signals that are severely quantized. Note that this is not only a problem with "old technology." It is common for even newly designed modern systems to use 8-bit A/D chips. Note that existing prognostic-surveillance systems do very poorly with highly quantized, low-resolution signals. The disclosed embodiments make use of a new technique to dequantize low-resolution time-series data to produce higher-resolution time-series data. See U.S. Pat. No. 10,496,084 (cited above).

In order to accurately perform the double-blind comparison discussed in this disclosure, it is important to have perfectly sampled "ground truth" signals, without missing values, clock-mismatch asynchronies, or low-resolution quantization. These ground truth signals make it possible for the double-blind comparison to be based on a precise quantitative evaluation of FAPs, MAPs, and "time-to-detect" (TTD) metrics. (Note that TTD metrics are a measure of the "lead time" or "early warning" for the onset of subtle degradation. This provides a measure of how long it takes to determine that the degradation is underway.)

Facilitating a Double-Blind Challenge

Our system operates by distributing a signal synthesizer to two "contestants." This signal synthesizer generates a realistic dataset of synthesized signals that look just like real signals from physical sensors that measure parameters, such as temperatures, voltages, currents, RPMs, power, vibrations. These signals are generated so that they: (1) are continuous (not quantized); (2) have no missing values; and (3) are synchronously sampled so they have no clock mismatch issues. Note that this signal synthesizer can be configured to generate any number of signals with any number of observations, wherein these parameters can be agreed upon in advance by the two contestants. Moreover, the signals are generated to have typical degrees of serial correlation and cross correlation, and realistic measurement noise.

Next, the signal synthesizer introduces sensor artifacts into the signals. During this process, the signal synthesizer removes values at randomly distributed positions in a random subset of time-series signals in the dataset. It also quantizes a random subset of the time-series signals. In doing so, the signal synthesizer can use different quantization levels for different signals. The system also introduces random time shifts (forward or backward) into random clusters of time-series signals in the dataset.

A fault seeder script is then used to insert random faults (with varying severities) into random signals at random times. Note that the two contestants agree in advance on the number of faults to seed into the data. In some embodiments, the random faults are only inserted into a second portion of the dataset, wherein a first portion of the dataset is used to train the prognostic-surveillance system.

Note that the seeded datasets for the two contestants (A and B) have different faults at different times in different signals. Moreover, the fault parameters for the faults in the seeded dataset for contestant A are encrypted, and the encryption key is held by contestant B until after the double-blind challenge is completed. Similarly, the fault parameters for the faults in the seeded dataset for contestant B are encrypted, and the encryption key is held by contestant A until after the double-blind challenge is completed. After both contestants analyze their respective datasets with randomized faults, they compare their results and a winner is selected.

Although this technique is described with two contestants, this technique can also be extended to compare any number of prognostic-surveillance techniques, either through binary comparisons between pairs of prognostic-surveillance blind techniques, or through a straightforward extension of the double-blind technique to a simultaneous comparison involving N contestants and N respective prognostic-surveillance techniques in a single contest.

In a variation on this double-blind technique, contestant B's prognostic-surveillance system is subsequently used to analyze the same seeded dataset that contestant A's prognostic-surveillance system previously analyzed, and contestant A's prognostic-surveillance system is subsequently used to analyze the same seeded dataset that contestant B's prognostic-surveillance system previously analyzed. This generates an additional set of results, which is likely to improve the accuracy of the final comparison.

Process for Performing a Double-Blind Comparison

Figure 4:
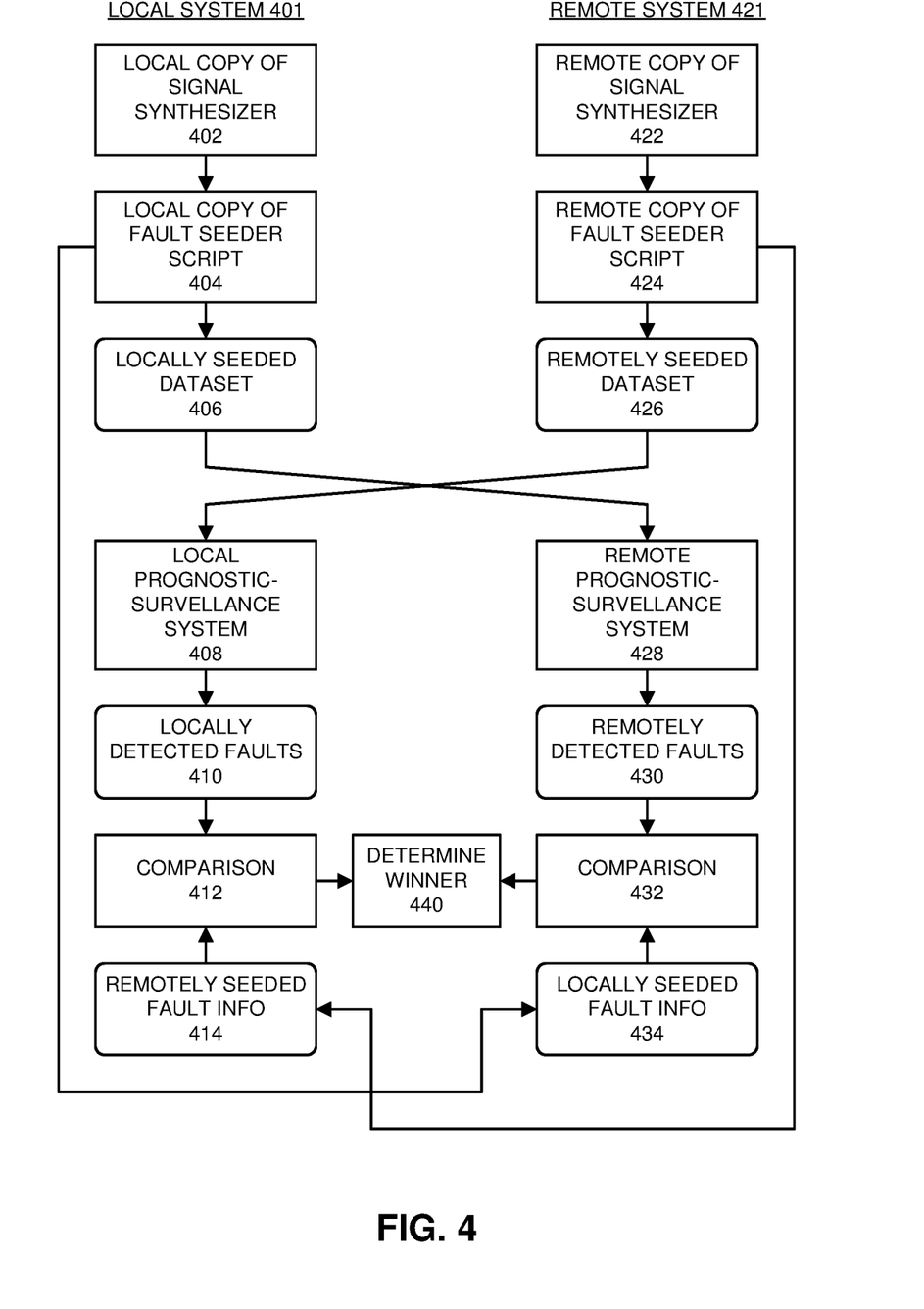
FIG. 4 presents a diagram illustrating a double-blind comparison in accordance with the disclosed embodiments.

FIG. 4 presents a high-level diagram for a process for performing a double-blind comparison between prognostic-surveillance systems belonging to two contestants, a local contestant and a remote contestant. This process takes place at two locations: a local system 401 belonging to the local contestant and a remote system 421 belonging to the remote contestant. At the start of this process, a signal synthesizer and a fault seeder script are distributed to both local system 401 and remote system 421.

Next, on local system 401, the local copy of the signal synthesizer 402 is used to produce a dataset with signal artifacts. This dataset is processed using local fault seeder script 404 to produce a locally seeded dataset 406. At the same time, on remote system 421, the remote copy of the signal synthesizer 422 is used to produce a dataset with signal artifacts. This dataset is processed using remote fault seeder script 424 to produce a remotely seeded dataset 426.

Next, locally seeded dataset 406 is communicated to remote system 421 where it is analyzed by local prognostic-surveillance system 408 to produce locally detected faults 410. At the same time, remotely seeded dataset 426 is communicated to local system 401 where it is analyzed by remote prognostic-surveillance system 428 to produce locally detected faults 430.

Then, local system 401 performs a comparison 412 between locally detected faults 410 and remotely seeded fault information obtained from remote system 421. Note that this remotely seeded fault information 414 can possibly be encrypted and sent along with remotely seeded dataset 426 from remote system 421, wherein a decryption key is subsequently sent from remote system 421 to local system 401 after locally detected faults 410 are generated. Alternatively, the remotely seeded fault information can be sent unencrypted after locally detected faults 410 are generated. Similarly, remote system 421 performs a comparison 432 between remotely detected faults 430 and locally seeded fault information obtained from local system 401. Finally, results of comparisons 412 and 432 are used to determine a winner 440 of the double-blind challenge.

Figure 5A:
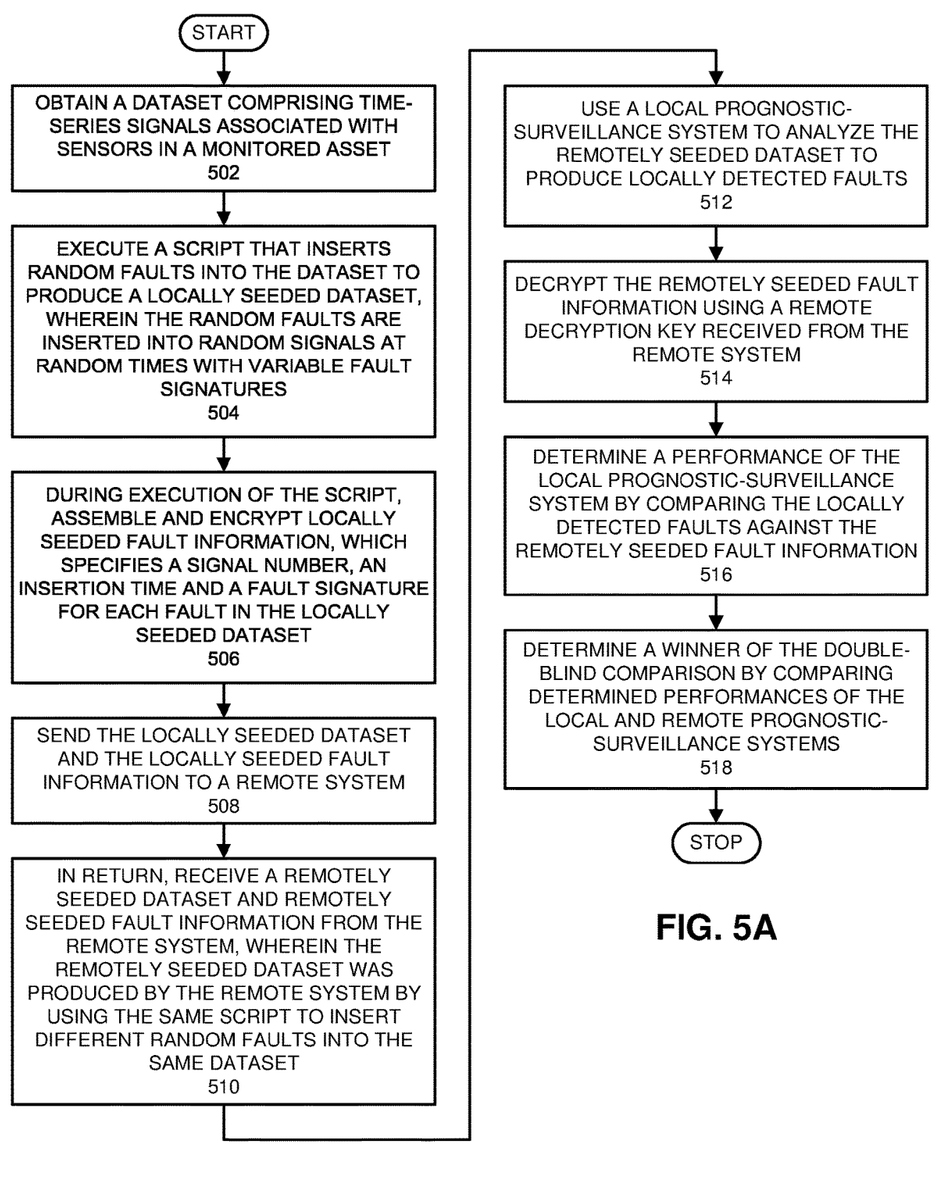
FIG. 5A presents a flow chart illustrating a local system side of a process for performing a double-blind comparison between competing prognostic-surveillance systems in accordance with the disclosed embodiments.

To provide additional details, FIG. 5A presents a flow chart illustrating a local system side of a process for performing a double-blind comparison between competing prognostic-surveillance systems in accordance with the disclosed embodiments. During operation, the local system obtains a dataset comprising time-series signals associated with sensors in a monitored asset (step 502). Next, the local system executes a script that inserts random faults into the dataset to produce a locally seeded dataset, wherein the random faults are inserted into random signals at random times with variable fault signatures (step 504). During execution of the script, the local system assembles and encrypts locally seeded fault information, which specifies a signal number, an insertion time and a fault signature for each fault in the locally seeded dataset (step 506). Next, the local system sends the locally seeded dataset and the locally seeded fault information to a remote system (step 508). In return, the local system receives a remotely seeded dataset and remotely seeded fault information from the remote system, wherein the remotely seeded dataset was produced by the remote system by using the same script to insert different random faults into the same dataset (step 510). Next, the local system uses a local prognostic-surveillance system to analyze the remotely seeded dataset to produce locally detected faults (step 512). Then, the local system decrypts the remotely seeded fault information using a remote decryption key received from the remote system (step 514). Next, the local system determines a performance of the local prognostic-surveillance system by comparing the locally detected faults against the remotely seeded fault information (step 516). Finally, the local system determines a winner of the double-blind comparison by comparing determined performances of the local and remote prognostic-surveillance systems (step 518).

Figure 5B:
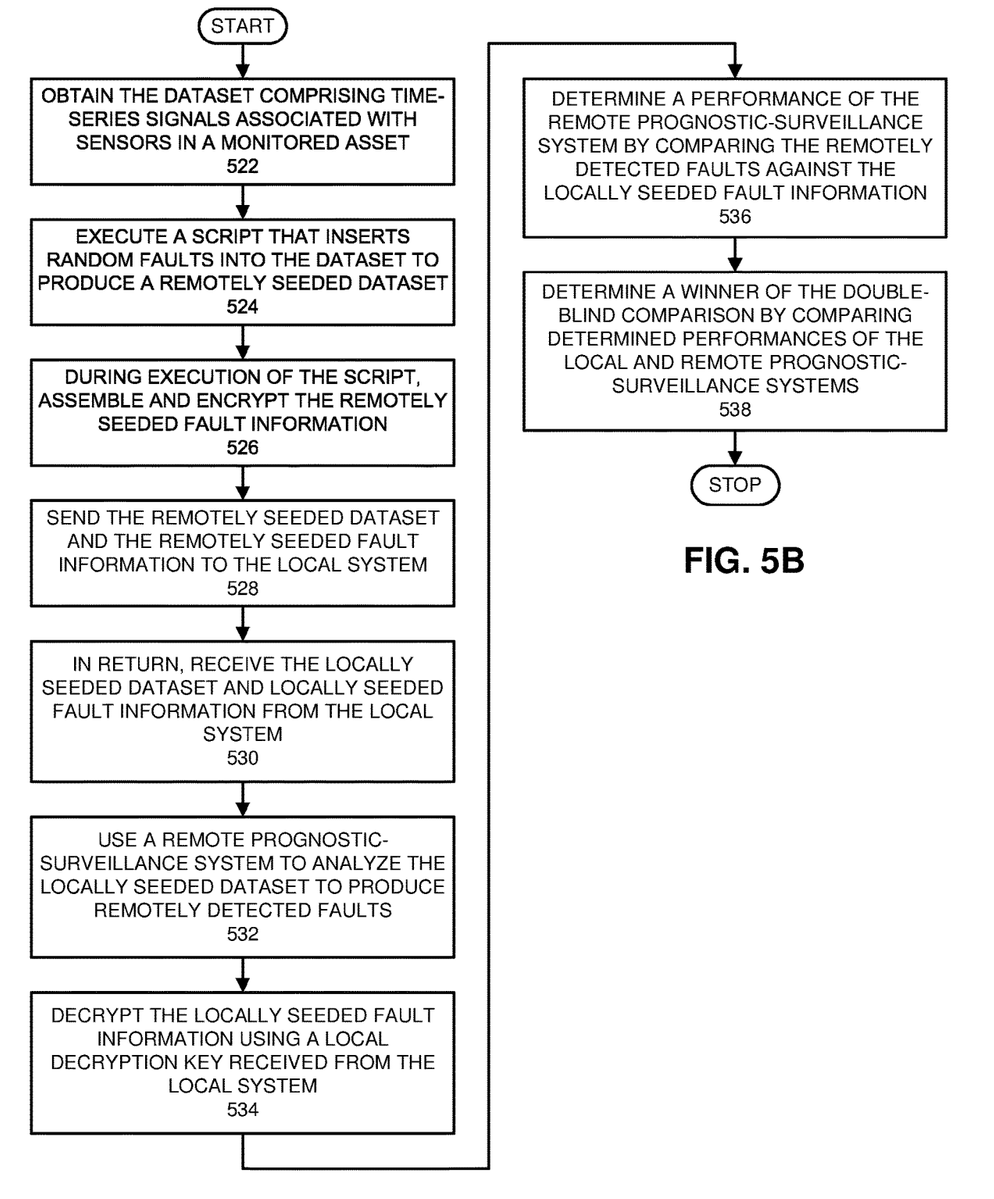
FIG. 5B presents a flow chart illustrating a remote system side of a process for performing a double-blind comparison between competing prognostic-surveillance systems in accordance with the disclosed embodiments.

FIG. 5B presents a flow chart illustrating a remote system side of a process for performing a double-blind comparison between competing prognostic-surveillance systems in accordance with the disclosed embodiments. During operation, the remote system obtains the dataset comprising time-series signals associated with sensors in the monitored asset (step 522). Next, the remote system executes the script to insert random faults into the dataset to produce the remotely seeded dataset (step 524). During execution of the script, the remote system assembles and encrypts the remotely seeded fault information (step 526). Then, the remote system sends the remotely seeded dataset and the remotely seeded fault information to the local system (step 528). In return, the remote system receives the locally seeded dataset and the locally seeded fault information from the local system (step 530). Next, the remote system uses a remote prognostic-surveillance system to analyze the locally seeded dataset to produce remotely detected faults (step 532). The remote system then decrypts the locally seeded fault information using a local decryption key received from the local system (step 534). Next, the remote system determines a performance of the remote prognostic-surveillance system by comparing the remotely detected faults against the locally seeded fault information (step 536). Finally, the remote system determines a winner of the double-blind comparison by comparing determined performances of the local and remote prognostic-surveillance systems (step 538).

Figure 5C:
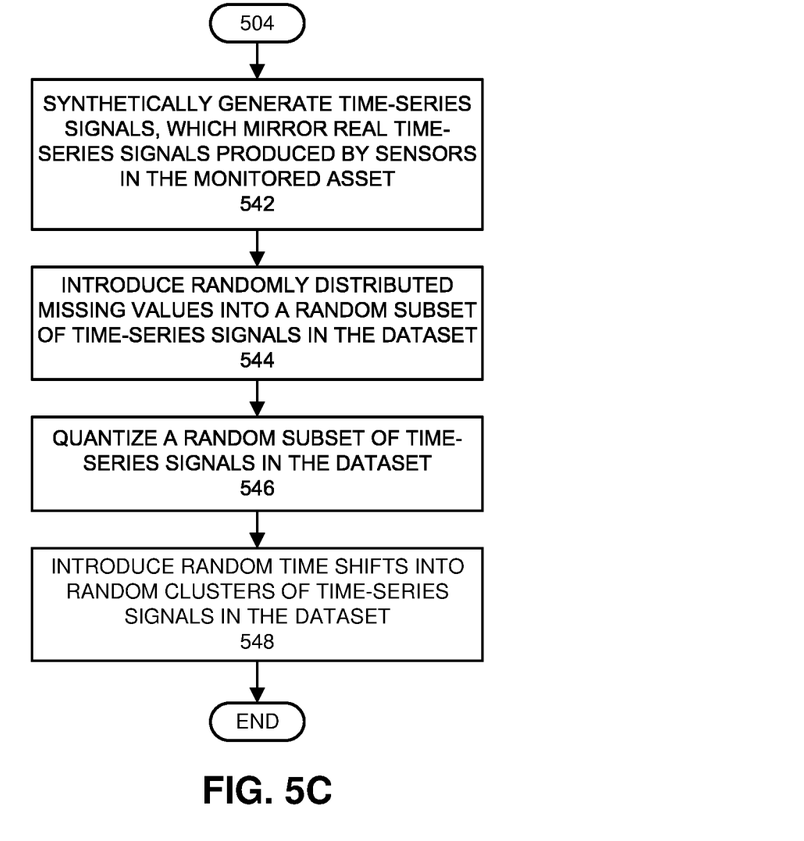
FIG. 5C presents a flow chart illustrating a process for generating a dataset comprising time-series signals with sensor artifacts in accordance with the disclosed embodiments.

FIG. 5C presents a flow chart illustrating a process for obtaining a dataset comprising time-series signals with sensor artifacts in accordance with the disclosed embodiments. (This flow chart illustrates operations performed during step 502 of the flow chart illustrated in FIG. 5A.) At the start of this process, the local system synthetically generates time-series signals, which mirror real time-series signals produced by sensors in the monitored asset (step 542). Next, the local system introduces randomly distributed missing values into a random subset of time-series signals in the dataset (step 544). The local system then quantizes a random subset of time-series signals in the dataset (step 546). Finally, the local system introduces random time shifts into random clusters of time-series signals in the dataset (step 548).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for performing a double-blind comparison between competing prognostic-surveillance systems, comprising:
   at a local system, obtaining a dataset comprising time-series signals associated with sensors in a monitored asset;
   executing a script that inserts random faults into the dataset to produce a locally seeded dataset, wherein the random faults are inserted into random signals at random times with variable fault signatures;
   during execution of the script, assembling locally seeded fault information, which specifies parameters for faults in the locally seeded dataset;
   sending the locally seeded dataset to a remote system;
   receiving a remotely seeded dataset from the remote system, wherein the remotely seeded dataset was produced by the remote system by using the same script to insert different random faults into the same dataset;
   using a local prognostic-surveillance system to analyze the remotely seeded dataset to produce locally detected faults; and
   determining a performance of the local prognostic-surveillance system by comparing the locally detected faults against remotely seeded fault information received from the remote system.

2. The method of claim 1, wherein the method further comprises:
   at the remote system, obtaining the dataset comprising time-series signals associated with sensors in the monitored asset;

executing the script to insert random faults into the dataset to produce the remotely seeded dataset;
during execution of the script, assembling the remotely seeded fault information;
sending the remotely seeded dataset to the local system;
receiving the locally seeded dataset from the local system;
using a remote prognostic-surveillance system to analyze the locally seeded dataset to produce remotely detected faults; and
determining a performance of the remote prognostic-surveillance system by comparing the remotely detected faults against the locally seeded fault information received from the local system.

3. The method of claim 2, wherein the method further comprises determining a winner of the double-blind comparison by comparing the determined performances of the local and remote prognostic-surveillance systems.

4. The method of claim 2,
wherein the remotely seeded fault information is encrypted at the remote system and is sent to the local system where it is decrypted with a decryption key obtained by the local system after the locally detected faults are produced; and
wherein the locally seeded fault information is encrypted at the local system and is sent to the remote system where it is decrypted with a decryption key obtained by the remote system after the remotely detected faults are produced.

5. The method of claim 1, wherein prior to inserting the faults, the method further comprises including sensor artifacts in the dataset, which involves one or more of the following:
introducing randomly distributed missing values into a random subset of time-series signals in the dataset;
quantizing a random subset of time-series signals in the dataset; and
introducing random time shifts into random clusters of time-series signals in the dataset.

6. The method of claim 1, wherein obtaining the dataset involves synthetically generating time-series signals, which mirror real time-series signals produced by sensors in the monitored asset.

7. The method of claim 1, wherein the fault signatures can include:
fault signatures obtained from a library of fault signatures; and
fault signatures based on superimposed ramps.

8. The method of claim 1,
wherein the random faults are only inserted into a second portion of the dataset; and
wherein a first portion of the dataset is used to train the local prognostic-surveillance system.

9. The method of claim 1, wherein using the local prognostic-surveillance system to analyze the remotely seeded dataset involves:
using a local inferential model to generate estimated values based on time-series signals from the remotely seeded dataset;
performing a pairwise differencing operation between actual values and the estimated values to produce residuals; and
analyzing the residuals to detect the incipient anomalies in the monitored system.

10. The method of claim 9, wherein detecting the incipient anomalies in the monitored system comprises detecting one or more of the following:

an impending failure of the monitored system; and
a malicious-intrusion event in the monitored system.

11. The method of claim 1, wherein determining the performance of the local prognostic-surveillance system involves considering the following:
a number of correctly identified faults;
a number of false alarms; and
a number of missed alarms.

12. A non-transitory computer-readable storage medium storing instructions that when executed by a computer cause the computer to perform a method for performing a double-blind comparison between competing prognostic-surveillance systems, the method comprising:
at a local system, obtaining a dataset comprising time-series signals associated with sensors in a monitored asset;
executing a script that inserts random faults into the dataset to produce a locally seeded dataset, wherein the random faults are inserted into random signals at random times with variable fault signatures;
during execution of the script, assembling locally seeded fault information, which specifies parameters for faults in the locally seeded dataset;
sending the locally seeded dataset to a remote system;
receiving a remotely seeded dataset from the remote system, wherein the remotely seeded dataset was produced by the remote system by using the same script to insert different random faults into the same dataset;
using a local prognostic-surveillance system to analyze the remotely seeded dataset to produce locally detected faults; and
determining a performance of the local prognostic-surveillance system by comparing the locally detected faults against remotely seeded fault information received from the remote system.

13. The non-transitory computer-readable storage medium of claim 12, wherein the method further comprises:
at the remote system, obtaining the dataset comprising time-series signals associated with sensors in the monitored asset;
executing the script to insert random faults into the dataset to produce the remotely seeded dataset;
during execution of the script, assembling the remotely seeded fault information;
sending the remotely seeded dataset to the local system;
receiving the locally seeded dataset from the local system;
using a remote prognostic-surveillance system to analyze the locally seeded dataset to produce remotely detected faults; and
determining a performance of the remote prognostic-surveillance system by comparing the remotely detected faults against the locally seeded fault information received from the local system.

14. The non-transitory computer-readable storage medium of claim 13, wherein the method further comprises determining a winner of the double-blind comparison by comparing the determined performances of the local and remote prognostic-surveillance systems.

15. The non-transitory computer-readable storage medium of claim 12, wherein prior to inserting the faults, the method further comprises including sensor artifacts in the dataset, which involves one or more of the following:
introducing randomly distributed missing values into a random subset of time-series signals in the dataset;
quantizing a random subset of time-series signals in the dataset; and introducing random time shifts into random clusters of time-series signals in the dataset.

16. The non-transitory computer-readable storage medium of claim 12, wherein using the local prognostic-surveillance system to analyze the remotely seeded dataset involves:
using a local inferential model to generate estimated values based on time-series signals from the remotely seeded dataset;
performing a pairwise differencing operation between actual values and the estimated values to produce residuals; and
analyzing the residuals to detect the incipient anomalies in the monitored system.

17. A system that performs a double-blind comparison between competing prognostic-surveillance systems, comprising:
a local system, which includes at least one processor and at least one associated memory; and
a comparison mechanism that executes on the at least one processor, wherein during operation, the comparison mechanism:
obtains a dataset comprising time-series signals associated with sensors in a monitored asset;
executes a script that inserts random faults into the dataset to produce a locally seeded dataset, wherein the random faults are inserted into random signals at random times with variable fault signatures;
during execution of the script, assembles locally seeded fault information, which specifies parameters for faults in the locally seeded dataset;
sends the locally seeded dataset to a remote system;
receives a remotely seeded dataset from the remote system, wherein the remotely seeded dataset was produced by the remote system by using the same script to insert different random faults into the same dataset;
uses a local prognostic-surveillance system to analyze the remotely seeded dataset to produce locally detected faults; and
determines a performance of the local prognostic-surveillance system by comparing the locally detected faults against remotely seeded fault information obtained from the remote system.

18. The system of claim 17, further comprising:
the remote system, which includes at least one remote processor and at least one associated remote memory; and
a remote comparison mechanism that executes on the at least one remote processor, wherein during operation, the remote comparison mechanism:
obtains the dataset comprising time-series signals associated with sensors in the monitored asset;
executes the script to insert random faults into the dataset to produce the remotely seeded dataset;
during execution of the script, assembles the remotely seeded fault information;
sends the remotely seeded dataset to the local system;
receives the locally seeded dataset from the local system;
uses a remote prognostic-surveillance system to analyze the locally seeded dataset to produce remotely detected faults; and
determines a performance of the remote prognostic-surveillance system by comparing the remotely detected faults against the locally seeded fault information received from the local system.

19. The system of claim 18, wherein the comparison mechanism additionally determines a winner of the double-blind comparison by comparing the determined performances of the local and remote prognostic-surveillance systems.

20. The system of claim 17, wherein prior to inserting the faults, the comparison mechanism includes sensor artifacts in the dataset, which involves one or more of the following:
introducing randomly distributed missing values into a random subset of time-series signals in the dataset;
quantizing a random subset of time-series signals in the dataset; and
introducing random time shifts into random clusters of time-series signals in the dataset.

* * * * *

UNITED STATES PATENT AND TRADEMARK OFFICE
CERTIFICATE OF CORRECTION

PATENT NO. : 12,038,830 B2  
APPLICATION NO. : 17/090151  
DATED : July 16, 2024  
INVENTOR(S) : Zhong et al.

Page 1 of 1

It is certified that error appears in the above-identified patent and that said Letters Patent is hereby corrected as shown below:

In the Drawings

On sheet 2 of 6, in FIG. 2, under reference numeral 206, Line 1, delete "THE THE" and insert -- THE --, therefor.

On sheet 3 of 6, in FIG. 4, under reference numeral 408, Line 3, delete "SURVELLANCE" and insert -- SURVEILLANCE --, therefor.

On sheet 3 of 6, in FIG. 4, under reference numeral 428, Line 3, delete "SURVELLANCE" and insert -- SURVEILLANCE --, therefor.

In the Specification

In Column 8, Line 25, after "surveillance" delete "blind".

Signed and Sealed this  
Tenth Day of December, 2024

Katherine Kelly Vidal  
*Director of the United States Patent and Trademark Office*